(12) United States Patent
Yu (10) Patent No.: US 11,260,490 B2
(45) Date of Patent: Mar. 1, 2022

(54) EDGE PROCESSING METHOD FOR DISPLAY PANEL HAVING IRREGULAR EDGE AND DISPLAY PANEL

(71) Applicant: Xiamen Tianma Micro-Electronics Co., Ltd, Xiamen (CN)

(72) Inventor: Quanpeng Yu, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 281 days.

(21) Appl. No.: 16/460,950

(22) Filed: Jul. 2, 2019

(65) Prior Publication Data

US 2020/0206863 A1 Jul. 2, 2020

(30) Foreign Application Priority Data

Dec. 29, 2018 (CN) .......................... 201811634273.6

(51) Int. Cl.
*G09G 3/30* (2006.01)
*B24B 9/06* (2006.01)
*G02F 1/01* (2006.01)
*G09G 3/20* (2006.01)

(52) U.S. Cl.
CPC .............. *B24B 9/06* (2013.01); *G02F 1/0102* (2013.01); *G09G 3/20* (2013.01); *G02F 2201/56* (2013.01); *G09G 2300/0439* (2013.01)

(58) Field of Classification Search
CPC . B24B 9/06; G02F 1/01; G02F 1/0102; G02F 2201/56; G09G 2300/0439; G09G 2310/0232
See application file for complete search history.

(56) References Cited

U.S. PATENT DOCUMENTS

| 2016/0189601 A1* | 6/2016 | Jung ........................ G09G 3/20 345/212 |
| 2018/0075797 A1* | 3/2018 | Park ..................... G09G 3/2092 |
| 2018/0122283 A1* | 5/2018 | Kim ...................... G09G 3/2074 |
| 2018/0144698 A1* | 5/2018 | Park ..................... G09G 3/3607 |
| 2019/0170918 A1* | 6/2019 | Qiao ....................... G02B 5/201 |

FOREIGN PATENT DOCUMENTS

| CN | 106373537 A | 2/2017 |
| CN | 106873224 A | 6/2017 |

OTHER PUBLICATIONS

First Chinese Office Action, dated Jun. 28, 2021, issued in corresponding Chinese Application No. 201811634273.6, filed Dec. 29, 2018, 19 pages.

* cited by examiner

*Primary Examiner* — Sanghyuk Park
(74) *Attorney, Agent, or Firm* — Christensen O'Connor Johnson Kindness PLLC (57) ABSTRACT

The present disclosure provides an edge processing method for a display panel and a display panel having a device for processing an edge. The method includes: determining an irregular edge of the display panel and determining all edge pixels the irregular edge passes through; dividing all the edge pixels into n sets of edge pixels, where n≥2; and inputting frame image information to the display panel, wherein at least one set of the n sets of edge pixels is configured to display a frame image in at least one display frame, and is configured not to display the frame image in at least another display frame.

18 Claims, 8 Drawing Sheets

| 1st | 2nd | 3rd | 4th | 5th | 6th | 7th | 8th |
|---|---|---|---|---|---|---|---|
| 1003 | 1002 | 1003 | 1002 | 1003 | 1002 | 1003 | 1002 |

FIG. 7

| 1st | 2nd | 3rd | 4th | 5th | 6th | 7th | 8th |
|---|---|---|---|---|---|---|---|
| 1001 | 1002 | 1003 | 1004 | 1001 | 1002 | 1003 | 1004 |

FIG. 8

| 1st | 2nd | 3rd | 4th | 5th | 6th | 7th | 8th | 9th |
|---|---|---|---|---|---|---|---|---|
| 1002 | 1003 | 1004 | 1002 | 1003 | 1004 | 1002 | 1003 | 1004 |

| | 1st | 2nd | 3rd | 4th | 5th | 6th | 7th | 8th | 9th |
|---|---|---|---|---|---|---|---|---|---|
| | 1007 | 1008 | 1006 | 1007 | 1008 | 1006 | 1007 | 1008 | 1006 |

FIG. 18

| | 1st | 2nd | 3rd | 4th | 5th | 6th | 7th | 8th | 9th |
|---|---|---|---|---|---|---|---|---|---|
| | 1010 | 1011 | 1012 | 1010 | 1011 | 1012 | 1010 | 1011 | 1012 |

FIG. 19

EDGE PROCESSING METHOD FOR DISPLAY PANEL HAVING IRREGULAR EDGE AND DISPLAY PANEL

CROSS-REFERENCE TO RELATED APPLICATIONS

The present application claims priority to Chinese Patent Application No. 201811634273.6, filed on Dec. 29, 2018, the content of which is incorporated herein by reference in its entirety.

FIELD

The present disclosure relates to the field of display technologies, and in particular, to an edge processing method for a display panel and a display panel having a device for processing an edge.

BACKGROUND

With the development of display technologies, a requirement of the consumer on the screen occupancy ratio of the display device is getting higher and higher. A display panel having a conventional shape can no longer satisfy the consumer's requirements. In order to increase the screen occupancy ratio, the display panel is rounded to be closer to an edge of the display device, or a groove or a hole is provided in the display panel to place components such as a camera, a light sensor, and a telephone receiver. This leads to a lot of special-shaped edges (i.e., irregular edges) on the display panels. Since sub-pixels are separately arranged, the sub-pixels may form a ladder-like zigzag edge at a special-shaped edge. One existing method is to weaken effects of the zigzag edge by reducing brightness of the sub-pixels at the special-shaped edge. However, this method requires a change of the panel design or occupies a large amount of driving chip resources, thereby resulting in an increase in power consumption. Moreover, the effect of improving the edge zigzag may be limited.

SUMMARY

In view of this, the present disclosure provided an edge processing method for a display panel and a display panel having a device for processing an edge, aiming to solve the above problems.

In an aspect, the present disclosure provides an edge processing method for a display panel. The edge processing method includes: determining an irregular edge of the display panel and determining all edge pixels the irregular edge passes through; dividing all the edge pixels into n sets of edge pixels, where n≥2; and inputting frame image information to the display panel, wherein at least one set of the n sets of edge pixels is configured to display a frame image in at least one display frame, and configured not to display the frame image in at least another display frame.

In another aspect, the present disclosure provides a display panel having a device for processing an edge. The display panel includes: an edge determination module configured to determine an irregular edge and determine all edge pixels the irregular edge passes through; a dividing module configured to divide all the edge pixels into n sets of edge pixels, where n≥2; and an image processing module configured to input frame image information to the display panel. The frame image information includes display information of the n sets of edge pixels, and at least one set of the n sets of edge pixels is configured not to display a frame image in at least one display frame.

BRIEF DESCRIPTION OF DRAWINGS

In order to more clearly illustrate technical solutions in embodiments of the present disclosure, the accompanying drawings used in the embodiments are briefly introduced as follows. It should be noted that the drawings described as follows are merely part of the embodiments of the present disclosure, other drawings can also be acquired by those skilled in the art.

DESCRIPTION OF EMBODIMENTS

For better illustrating technical solutions of the present disclosure, embodiments of the present disclosure will be described in detail as follows with reference to the accompanying drawings.

It should be noted that, the described embodiments are merely exemplary embodiments of the present disclosure, which shall not be interpreted as providing limitations to the present disclosure. All other embodiments obtained by those skilled in the art according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

It should be understood that, although a set of edge pixels may be described using the terms of "first", "second", "third", etc., in the embodiments of the present disclosure, the set of edge pixels will not be limited to these terms. These terms are merely configured to distinguish sets of edge pixels from one another. For example, without departing from the scope of the embodiments of the present disclosure, a first set of edge pixels may also be referred to as a second set of edge pixels, and similarly, a second set of edge pixels may also be referred to as a first set of edge pixels.

According to the description in the background, a lot of special-shaped panels currently have zigzag edges. One existing method is to weaken effects of the zigzag edge by reducing brightness of the sub-pixels at the special-shaped edge. However, this method requires a change of the panel design or occupies a large amount of driving chip resources, thereby resulting in an increase in power consumption. There are generally two implementations for this method. In a first implementation, the brightness of the sub-pixels at the edge is reduced under a same grayscale voltage by means of a panel design, for example, by changing a width-to-length ratio of a driving transistor of a pixel circuit of the sub-pixel at the edge so as to reduce a driving current. In a second implementation, a grayscale voltage is calculated by the driving chip before being provided to the sub-pixel at the edge, and then is output with the reduced brightness. For the first implementation, a layout of the entire display panel needs to be changed, and masks in all the processes need to be redesigned, resulting in the increased design cost and mold cost. For the second implementation, the grayscale voltage is first provided to the driving chip for processing the edge and then provided to the display panel. The existence of the additional procedure for processing the edge may increase the delay time and thus cannot meet consumers' demand. In an e-sports display panel, for example, in an FPS game, a next frame of image may be delayed for a while. As a result, viewing a target will be delayed, which is problematic to an e-sports player. Moreover, although the brightness of the pixels at the edge is reduced in the related art, which may improve the problem of the zigzag at the edge to some extent, the zigzag-shaped edge would still exist due to a fixed position for the edge. Then, the zigzag at the edge may not be eliminated and could still be viewed during the display process.

The present disclosure provides an edge processing method for a display panel, and a display panel having a device for processing an edge, which can solve the above-mentioned technical problems.

Figure 1:
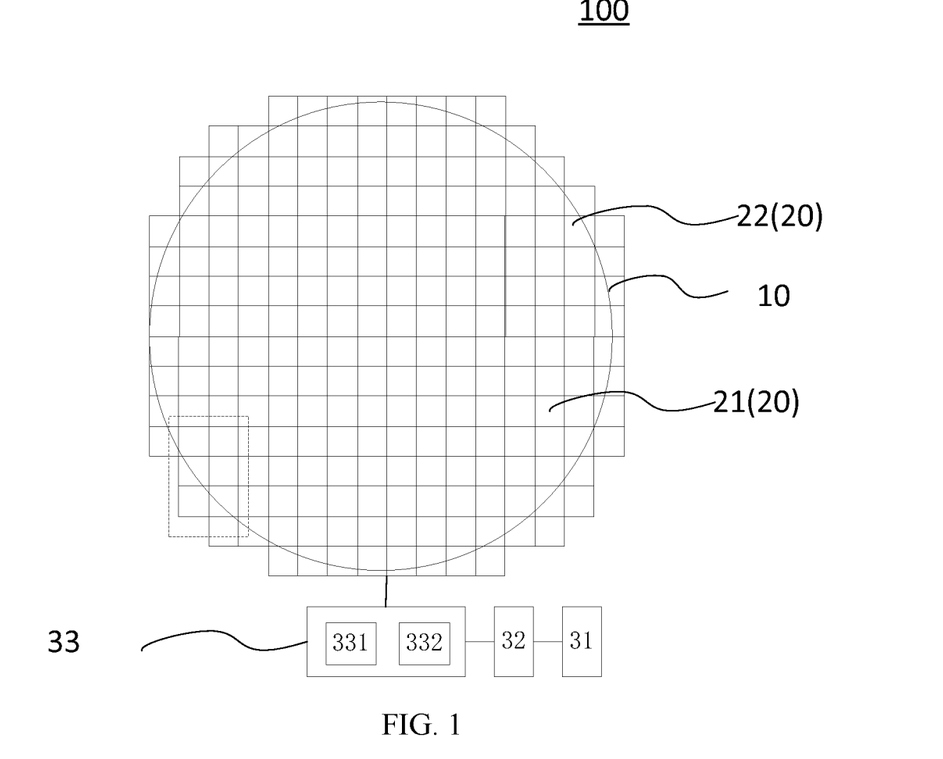
FIG. 1 is a schematic diagram of a display panel according to an embodiment of the present disclosure.
Figure 2:
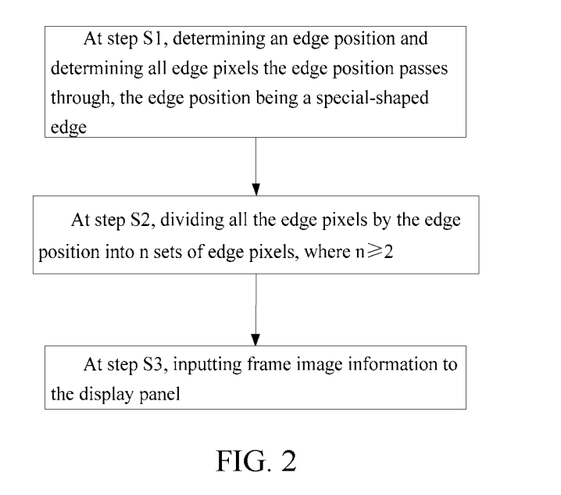
FIG. 2 is a schematic diagram of an edge processing method for a display panel according to an embodiment of the present disclosure.

FIG. 1 is a schematic diagram of a display panel according to an embodiment of the present disclosure. FIG. 2 is a schematic diagram of an edge processing method for a display panel according to an embodiment of the present disclosure.

With reference to FIG. 1 and FIG. 2, the display panel 100 includes pixels 20, and the pixels 20 include a non-edge pixel 21 located within the special-shaped display panel and an edge pixel 22 located at an edge of the special-shaped display panel. Here, the non-edge pixel 21 located within the special-shaped display panel refers to a pixel that the edge of the special-shaped display panel does not pass through. The edge pixel 22 refers to a pixel at an edge position 10 of the special-shaped display that the panel passes through. The edge position 10 of the special-shaped display panel refers to a portion of an outline of the special-shaped display panel that is neither perpendicular nor parallel to a row direction. Macroscopically, the edge position in the present disclosure is at least one smooth curve, or the edge position is at least one oblique line. The edge position can be a preset edge position, so as to better limit the edge position under a visual effect.

An embodiment provides an edge processing method for a display panel, including the following steps.

At step S1, an edge position is determined and all edge pixels that the edge position passes through are determined. The edge position is a special-shaped edge. First, all edge pixels 22 located at the edge of the special-shaped display panel are determined.

Figure 3:
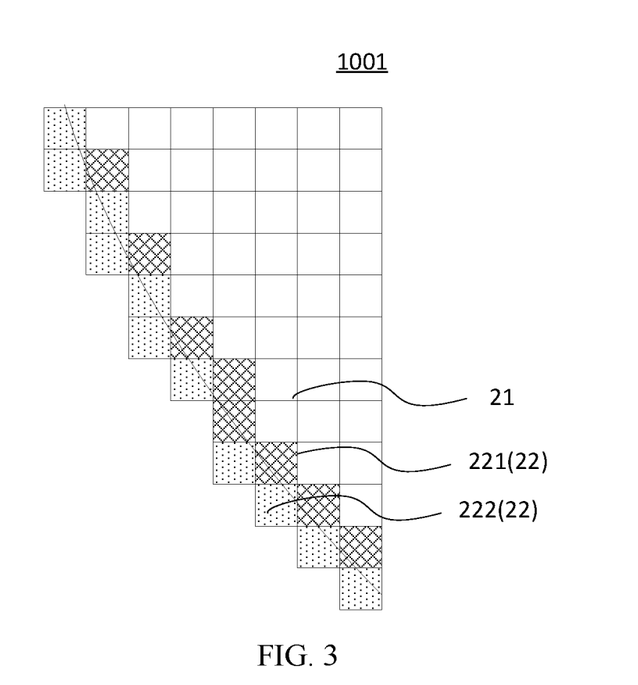
FIGS. 3 to 6 each are a schematic diagram of a partial frame image according to an embodiment of the present disclosure.

At step S2, all the edge pixels are divided into n sets of edge pixels, where n≥2. Then, the edge pixels are divided into sets of edge pixels, so that the edge pixels 22 can be used in a subsequent frame display process. FIG. 3 is a partial enlarged schematic diagram of a dashed box of FIG. 1. In an example, at this step, the edge pixels 22 are divided into a first set of edge pixels 221 and a second set of edge pixels 222, so that the first set of edge pixels 221 or the second set of edge pixels 222 can be directly selected for being displayed or not displayed in the subsequent frame.

At step S3, frame image information is inputted to the display panel. At least one set of edge pixels is configured to display a frame image in at least one display frame, and configured not to display the frame image in at least another display frame. In an example, as shown in FIG. 3, the first set of edge pixels 221 is used for display in at least one frame, and an edge of the image in this frame is the edge of the first set of edge pixels 221. Then, the first set of edge pixels 221 is not used for display in another frame, and an edge of the image in this frame is not the edge of the first set of edge pixels 221. Therefore, there is no fixed edge position for the display panel of the present disclosure, and different frames correspond to different edge positions. In other words, the edge positions corresponding to different frame images are dynamically adjusted, thereby blurring the zigzag edge.

In the related art, although the brightness of the edge pixels are reduced and the zigzag at the edge is improved to some extent, the zigzag edge still exists due to the fixed edge position, and the zigzag at the edge is not eliminated and can still be seen during the image display. In the present disclosure, the edge pixels are divided into sets of edge pixels, and changing the sets of edge pixels in different frame images leads to different edge positions in different frame images, so that the edge position can be located at a preset edge position under the visual effect. In this way, the edge can be blurred and the zigzag at the edge can be eliminated. In the present disclosure, the zigzag at the edge can be blurred by dynamically adjusting edge positions corresponding to different frame images. Meanwhile, the display panel does not need to be redesigned, and thus the design cost and mold cost can be reduced. Further, the present disclosure has a good applicability and can be applied to special-shaped panels having different shapes.

On the other hand, the present disclosure can also achieve a purpose of alleviating the zigzag at the edge by reducing the brightness of the edge pixels. Taking a display panel with a frame rate of 60 Hz as an example, among 60 frames, the first set of edge pixels 221 is used for display in 10 frame images and is not used for display in the remaining 50 frame images. Thus, according to a principle of brightness accumulation, within one second, human eyes may receive brightness in $\frac{1}{6}$ of the one second and may not receive brightness or receive the lower brightness in $\frac{5}{6}$ of the one second. In this case, the actual visual perception is that the brightness is lowered. Similarly, for the 60 frames, the second set of edge pixels 221 is used for display in 30 frame images and is not used for display in the remaining 30 frame images. Thus, according to the principle of brightness accumulation, within one second, human eyes may receive brightness in $\frac{1}{2}$ of the one second and may not receive brightness or receive the lower brightness in $\frac{1}{2}$ of the one second. In this case, the actual visual perception is that the brightness is lowered. In this way, the zigzag at the edge can be alleviated.

It should be noted that, in the present disclosure, at least one set of edge pixels is configured to display a frame image in at least one display frame, and is configured not to display the frame image in at least another display frame. Here, "being configured not to display the frame image" means that this set of edge pixels is not used for display (that is, this set of edge pixels is not in a light-emitting state or not in an operating state) or means that this set of edge pixels displays a color having a low brightness such as a black color or a gray color. A purpose of the present disclosure is to make the edge position appear unfixed, thereby achieving an effect of blurring the zigzag at the edge. In this embodiment, the set of edge pixels displays a black color or a gray color or is not used for display, so that the set of edge pixels can be invisible to the observer. As long as the set of edge pixels is visible to the observer in some frames and is invisible to the observer in some other frames, the edge position will be unfixed and the zigzag edge will be blurred. Therefore, in the present disclosure, "being configured not to display the frame image" may also mean displaying a color having a low brightness such as a black color or a gray color. In an example, as shown in FIG. 3, still taking the display panel with a frame rate of 60 Hz as an example, all pixels in the first set of edge pixels 221 have a normal brightness in 30 frames and are not used for display in the remaining 30 frames. Thus, the observer can observe that the zigzag edge is located at the edge of the first set of edge pixels 221 in some frames, and that no zigzag edge is located at the edge of the first set of edge pixels 221 in some other frames. In this way, the edge position is unfixed, and the zigzag at the edge is blurred. In another example, taking the display panel with a frame rate of 60 Hz as an example, all pixels in the second set of edge pixels 222 have a normal brightness in 30 frames and display a black color or a gray color having a low brightness in the remaining 30 frames. Thus, the observer can observe that the edge of the frame image is located at the edge of the second set of edge pixels 222 in some frames, and that the edge of the frame image is not located at the edge of the second set of edge pixels 222 in some other frames. In this way, the edge position is unfixed, and the zigzag at the edge is blurred.

Further, in this embodiment, the zigzag at the edge can be blurred by dynamically adjusting the edge position and reducing the brightness of the edge pixels at the same time. Therefore, on the basis of the above embodiments, in order to further make the brightness of the edge pixels of the display panel visually lower than the brightness of the pixels in normal display, in a same display frame, a maximum display brightness of pixels in the set of edge pixels that are used for displaying the frame image is lower than a maximum display brightness of pixels other than the edge pixels of the display panel. For example, the maximum brightness of the edge pixels 22 is 200 nit, and the maximum brightness of the non-edge pixels 21 is 500 nit. In this way, the brightness of the edge pixel 22 is reduced in a case of dynamic display, and the brightness of the edge pixel 22 is lower than the brightness of the non-edge pixel 21 even if a certain frame image is captured. This can also alleviate the zigzag at the edge.

Figure 7:
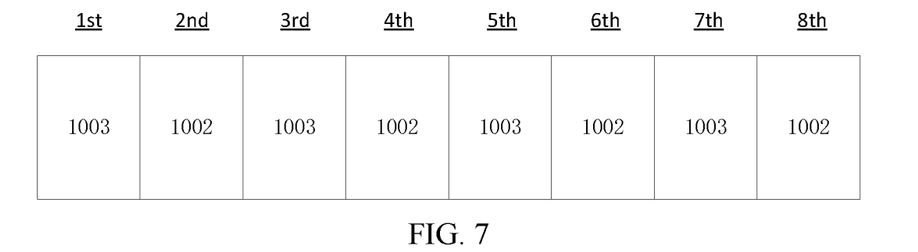
FIGS. 7 to 9 each are a schematic diagram of a partial frame arrangement according to an embodiment of the present disclosure.
Figure 8:
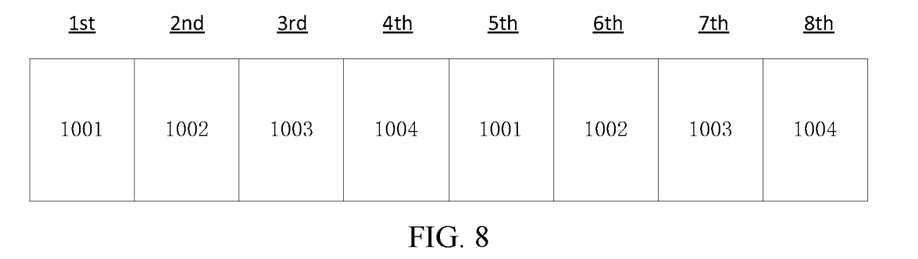
Figure 9:
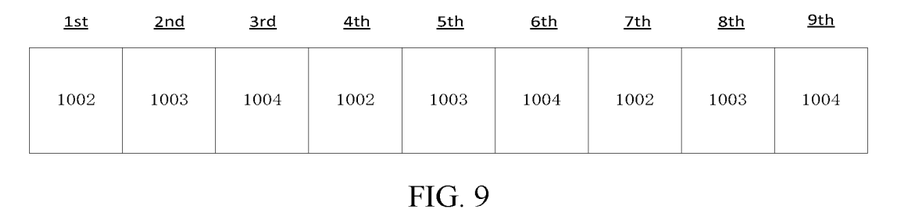
Figure 10:
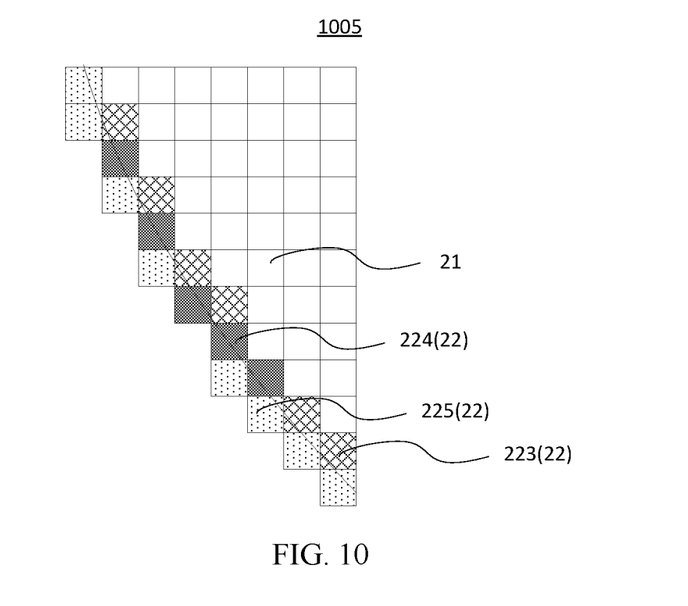
FIGS. 10 to 17 each are a schematic diagram of a partial frame image according to another embodiment of the present disclosure.
Figure 11:
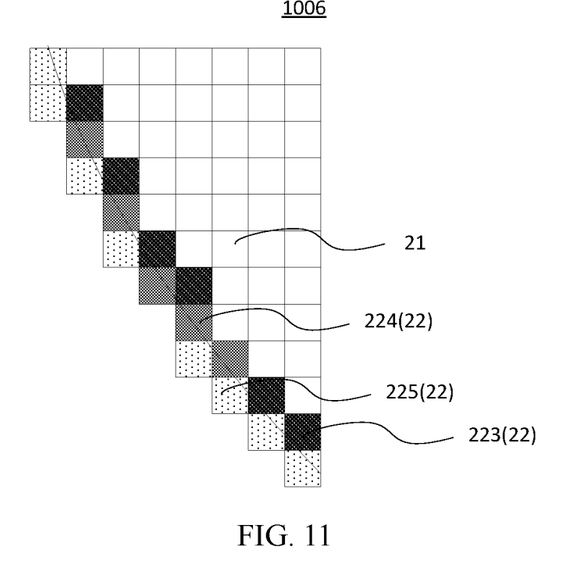
Figure 12:
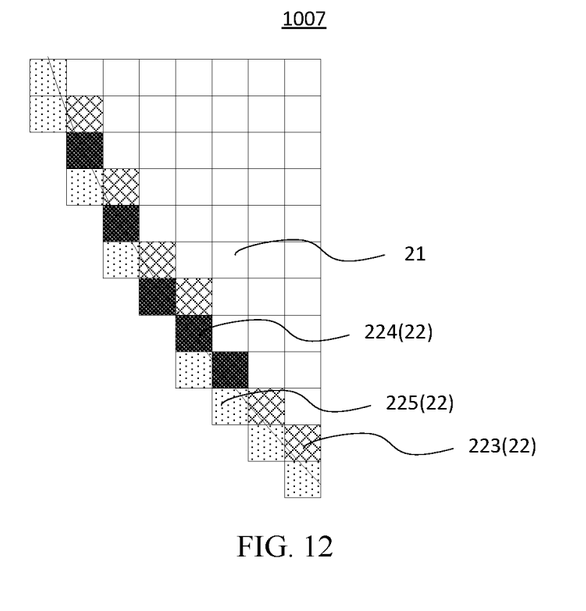
Figure 13:
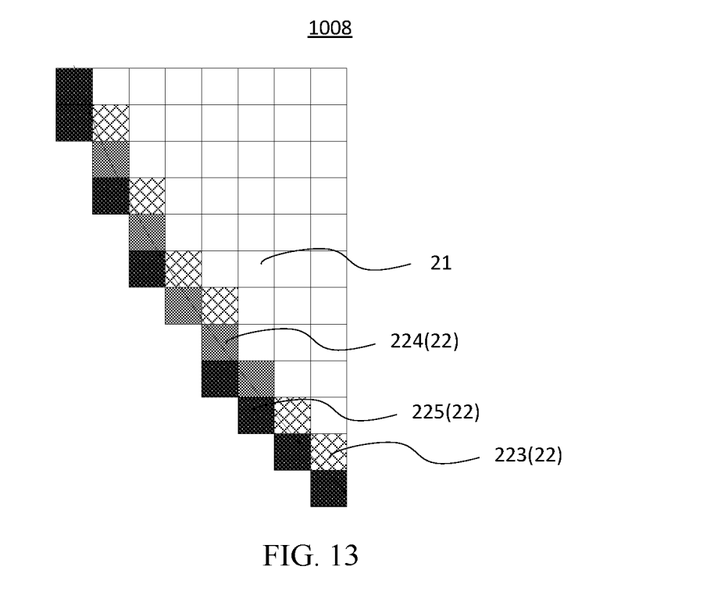
Figure 14:
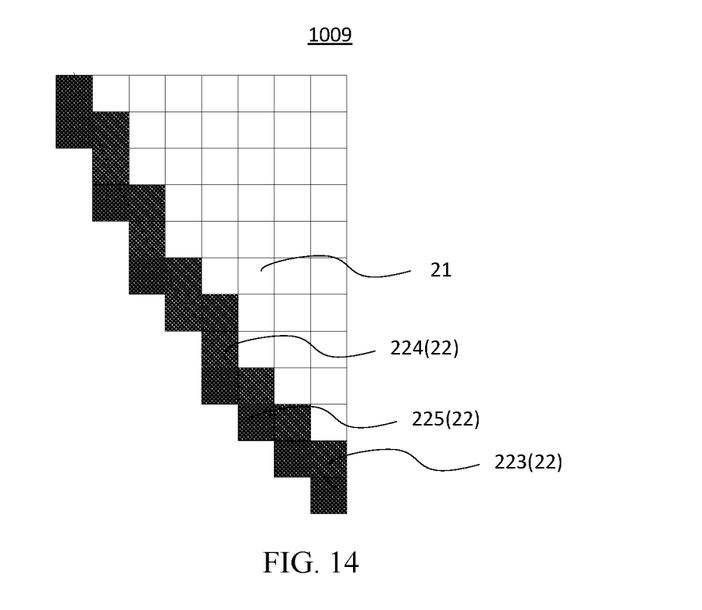
Figure 15:
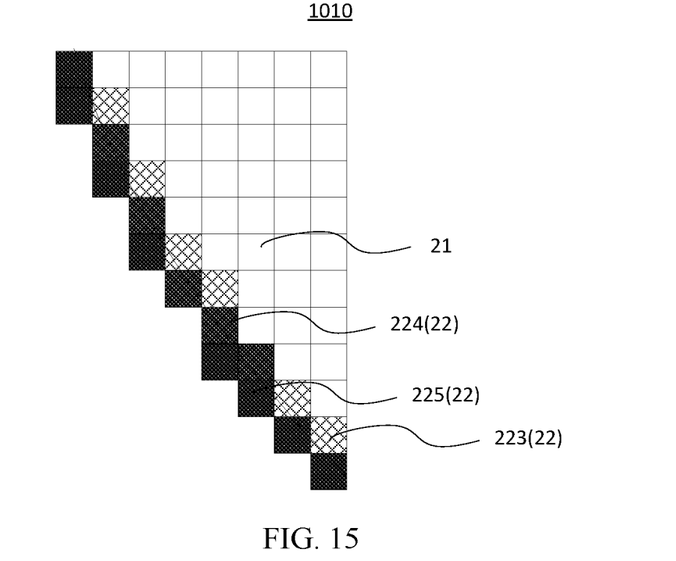
Figure 16:
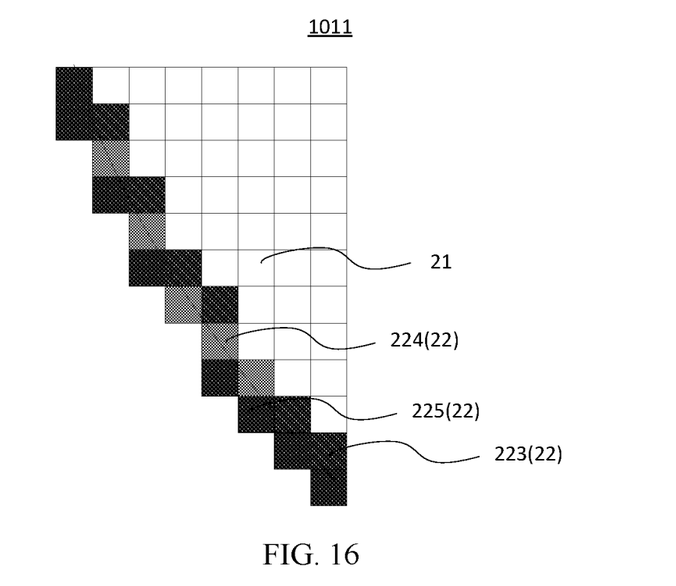
Figure 17:
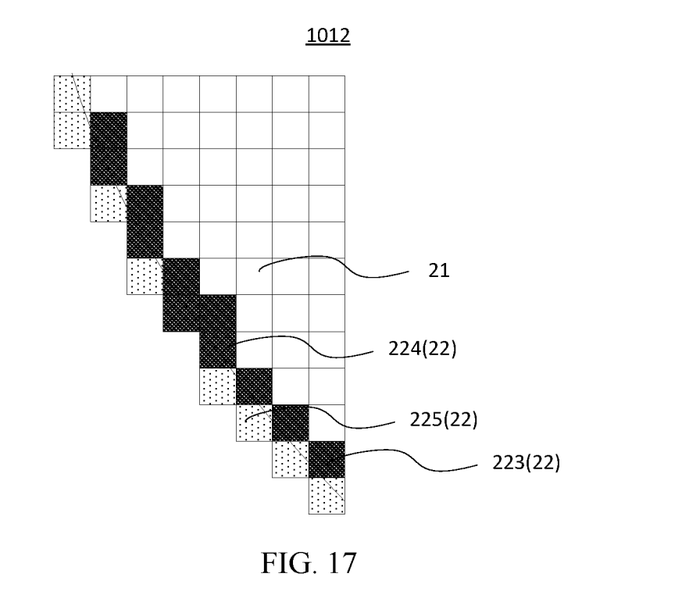

FIGS. 3 to 6 each are a schematic diagram of a partial frame image in an embodiment of the present disclosure, and FIGS. 7 to 9 each are a schematic diagram of a partial frame arrangement in an embodiment of the present disclosure.

With reference to FIG. 3, edge pixels can be divided into two sets, i.e., a first set of edge pixels 221 and a second set of edge pixels 222. The dividing is performed based on a percentage of a part of the edge pixels 22 located inside the edge position 10. An area of a part of edge pixels in the first set of edge pixels 221 located at a side of the edge position close to a center of the display region is larger than or equal to 50% of a total area of the edge pixels 221. An area of a part of edge pixels in the second set of edge pixels 222 located at the side of the edge position 10 close to the center of the display region is smaller than 50% of a total area of the edge pixels 222. If a region of the display panel 100 located inside the edge position 10 is referred to as a preset display region, an edge pixel 22 belongs to the first set of edge pixels 221 when an area of a part of this edge pixel 22 located in the preset display region is larger than or equal to 50% of a total area of this edge pixel 22; and an edge pixel 22 belongs to the second set of edge pixels 222 when an area of a part of this edge pixel 22 located in the preset display region is smaller than 50% of a total area of this edge pixel 22. With such dividing of the sets of edge pixels on basis of respective areas, at least two dynamic edges can be arranged in a direction from the display region towards the non-display region, so that an edge is located therebetween under the visual effect, thereby blurring the zigzag at the edge.

An embodiment of the present disclosure will be described in the following by way of an example, in which sets of pixels are divided on basis of respective areas.

FIGS. 3 to 6 each are a partial enlarged schematic diagram of a dashed box of FIG. 1, which represents a possible frame image based on the abovementioned dividing. A frame image 1001 represents that the first set of edge pixels 221 and the second edge pixels 222 are both configured to display the frame image. A frame image 1002 represents that the first set of edge pixels 221 is configured not to display the frame image and the second set of edge pixels 222 is configured to display the frame image. A frame image 1003 represents that the first set of edge pixels 221 is configured to display the frame image and the second set of edge pixels 222 is configured not to display the frame image. A frame image 1004 represents that both the first set of edge pixels 221 and the second set of edge pixels 222 are configured not to display the frame image.

FIG. 7 to FIG. 9 each are a schematic diagram of a partial frame arrangement in an embodiment of the present disclosure. FIG. 7 represents that the frame image 1003 is displayed in a first frame, the frame image 1002 is displayed in a second frame, and then displaying is cycled in this order. In other words, the frame image 1003 and the frame image 1002 are alternately displayed. FIG. 8 represents that the frame image 1001 is displayed in a first frame, the frame image 1002 is displayed in a second frame, the frame image 1003 is displayed in a third frame, the frame image 1004 is displayed in a fourth frame, and then displaying is cycled in this order. FIG. 9 represents that the frame image 1002 is displayed in a first frame, the frame image 1003 is displayed in a second frame, the frame image 1004 is displayed in a third frame, and then displaying is cycled in this order.

In an embodiment of the present disclosure, different sets of edge pixels are configured not to display a frame image in at least two display frames. According to the above embodiments, at least one set of edge pixels is configured to display a frame image in one frame and not to display a frame image in another frame. In this way, two edge positions may appear in different frames. Since the two edge positions correspond to a same set of edge pixels being used for display and being not used for display, the two edge positions are two edges located at opposite sides of this set of edge pixels and corresponding to one another, and a situation resulting in a dynamic edge is relatively non-complicated. Based on this, this embodiment provides that different sets of edge pixels are configured not to display a frame image in at least two display frames, thereby enriching situations resulting in a dynamic edge. The resulting at least two edges correspond to at least two sets of edge pixels. In this way, the edge position can be further dynamically adjusted, and thus the zigzag at the edge can be blurred. On the other hand, if the first set of edge pixels 221 is configured not to display a frame image in all frames, the frame image 1002 will be displayed in all frames. As a result, the actual visual effect is that some of the edge pixels 22 always have no light (i.e., these edge pixels 22 are always not energized). Although this may also reduce the brightness of the edge, there appears to be a lot of bad points (i.e., poorly illuminated) for the edge, thereby resulting in a poor display effect. Therefore, in this embodiment, different sets of edge pixels are configured not to display a frame image in at least two display frames, so as to avoid a situation in which some sets of edge pixels always have no light, which would otherwise lead to bad points.

Further, in an embodiment, different sets of edge pixels are configured not to display a frame image in two successive frames. Taking the display panel with a frame rate of 60 Hz as an example, if a same set of edge pixels is configured not to display a frame image for successive 30 Hz, the edge position that corresponds to this set of edge pixels configured not to display a frame image can be visible for ½ of one second. It is known that the retention time for an human eye is approximately 1/24 of one second, which is much shorter than ½ of one second, so the human eye can clearly see this set of edge pixels that is configured not to display a frame image for 30 successive frames. Further, the smaller the number of successive frames is, the more difficult it is for the human eye to observe. If a same set of edge pixels is configured not to display a frame image in two successive frames, this means that the edge position not displayed can be visible in 1/30 of one second, which is very close to 1/24 of one second, and thus it is in an obscurity boundary between those that can be seen and those that cannot. Therefore, in an embodiment, different sets of edge pixels are configured not to display a frame image in two successive display frames. In this way, a duration during which any set of edge pixels is configured not to perform displaying will not exceed 1/60 of one second. In this case, the human eye cannot observe the edge position corresponding to the set of edge pixels configured not to perform displaying, but can see the overlapping effect of the edge positions corresponding to different sets of edge pixels due to the view retention of the human eye, which can further alleviate the zigzag at the edge.

In another embodiment of the present disclosure, there are m sets of frame image information, and different sets of frame image information correspond to different sets of edge pixel that are configured not to display the frame image, where m≤n. In an example, all the edge pixels are divided into three sets of edge pixels, i.e., a first set of edge pixels, a second set of edge pixels, and a third set of edge pixels. The frame image information includes three sets of frame image information, i.e., a first set of frame image information, a second set of frame image information, and a third set of frame image information. In the first set of frame image information, the first set of edge pixels is configured not to display a frame image. In the second set of frame image information, the second set of edge pixels is configured not to display a frame image. In the third set of frame image information, the third set of edge pixels is not configured to display a frame image. Different sets of frame image information respectively form different edge positions, so that different combinations of edge positions can be formed by different display order combinations of the sets of frame image information, thereby further alleviating the zigzag at the edge.

Further, the m sets of frame image information are sequentially displayed. With reference to FIGS. 3-5 and FIG. 9, the frame images can be divided into three sets. Here, a first set of frame images 1002 corresponds to the first set of edge pixels 221 being configured not to perform displaying. A second set of frame images 1003 corresponds to the second set of edge pixels 222 being configured not to perform displaying. A third set of frame images 1004 corresponds to both the first set of edge pixels 221 and the second set of edge pixels 222 being configured not to perform displaying. As shown in FIG. 9, the three sets of frame image information are sequentially displayed. The frame image 1002 is displayed in the first frame, the frame image 1003 is displayed in the second frame, and the frame image 1004 is displayed in the third frame, and then displaying is cycled in this order. In another embodiment, with reference to FIGS. 3-6 and FIG. 8, the frame images may be divided into four sets. Here, a first set of frame images 1001 corresponds to no set of edge pixels being configured not to perform displaying. A second set of frame images 1002 corresponds to the first set of edge pixels 221 being configured not to perform displaying. A third set of frame images 1003 corresponds to the second set of edge pixels 222 being configured not to perform displaying. A fourth set of frame images 1004 corresponds to both the first set of edge pixels 221 and the second set of edge pixels 222 being configured not to perform displaying. As shown in FIG. 8, the four sets of frame image information are sequentially displayed. The frame image 1001 is displayed in the first frame, the frame image 1002 is displayed in the second frame, the frame image 1003 is displayed in the third frame, and the frame image 1004 is displayed in the fourth frame, and then displaying is cycled in this order. In this way, the edge positions can change regularly and dynamically to achieve the purpose of blurring the edge position, thereby further alleviating the zigzag at the edge.

Further, a frame image including an edge pixel having the largest area in the preset display region can be displayed more times than a frame image including an edge pixel having the largest area outside the preset display region. For example, for a display panel with 60 Hz, the frame image 1003 appears 40 times, and the frame image 1002 appears 20 times. The larger the area of a portion of the edge pixel located in the preset display region is, the closer this edge pixel is to the preset display region. With the arrangement of this embodiment, the brightness of edge pixels are gradually reduced in a direction from a position close to the edge position 10 to a position away from the edge position 10. In this way, the edge zigzag is more inconspicuous, and thus the zigzag at the edge can be alleviated.

Figure 4:
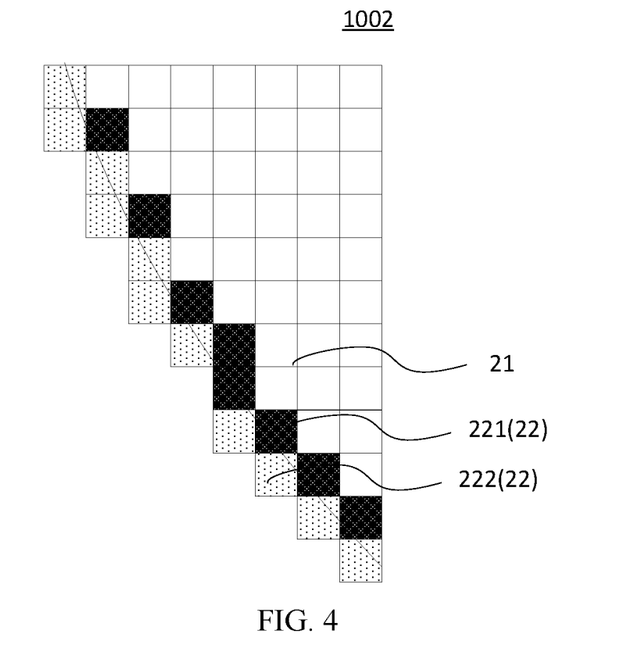
Figure 5:
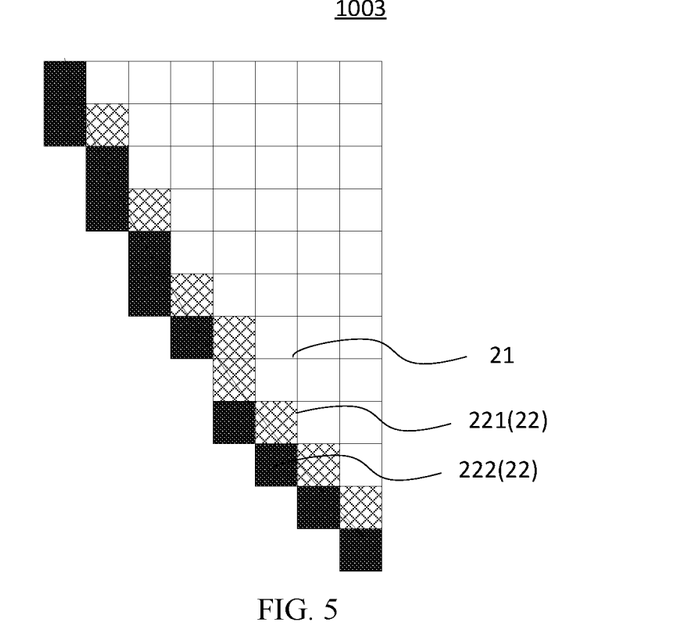
Figure 6:
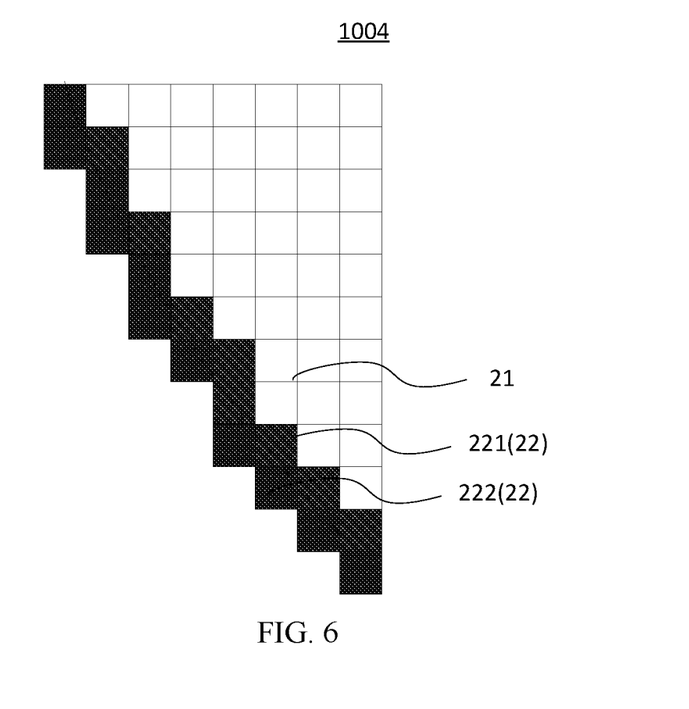

In another embodiment of the present disclosure, with reference to FIG. 4, FIG. 5 and FIG. 7, the edge pixels are divided into two sets of edge pixels, i.e., a first set of edge pixels 221 and a second set of edge pixels 222. The frame images are divided into odd-numbered frame images and even-numbered frame images.

In the odd-numbered frame image, the first set of edge pixels 221 is configured to display the frame image, that is, the frame image 1001 or the frame image 1003. In the even-numbered frame image, the first set of edge pixels 221 is configured not to display the frame image, that is, the frame image 1002 or the frame image 1004. Therefore, it is possible that the frame image 1001 is displayed in the odd-numbered display frame and the frame image 1002 is displayed in the even-numbered display frame, or it is possible that the frame image 1003 is displayed in the odd-numbered display frame and the frame image 1002 is displayed in the even-numbered display frame, or it is possible that the frame image 1001 is displayed in the odd-numbered display frame and the frame image 1004 is displayed in the even-numbered display frame. It should be noted that according to the above embodiments, a case in which the frame image 1003 is displayed in the odd-numbered frame and the frame image 1004 is displayed in the even-numbered frame may result in potentially undesirable result of successive non-display of the second set of edge pixels.

In this embodiment, in a sequential displaying process of frame images, the first set of edge pixels being configured to display the frame image and the case in which the first set of edge pixels being configured not to display the frame image alternately appear. As a result, the edge position corresponding to the first set of edge pixels being configured to display the frame image and the edge position corresponding to the first set of edge pixels being configured not to display the frame image alternatively appear. Thus, a visual effect of two edge positions overlapping with each other is achieved due to the view retention of the human eye. Under this visual effect, an edge position obtained by overlapping the two edge positions is located between the two edge positions, which is advantageous for blurring the edge position and further alleviating the zigzag at the edge.

Further, in the odd-numbered frame image, the first set of edge pixels 221 is configured to display the frame image, and the second set of edge pixels 222 is configured not to display the frame image. In the even-numbered frame image, the first set of edge pixels 221 is configured not to display the frame image, and the second set of edge pixels 222 is configured to display the frame image. As shown in FIG. 7, the frame image 1003 is displayed in the first frame, and the frame image 1002 is displayed in the second frame, and then displaying is cycled alternately in this order. In this way, the first set of frame image 221 and the second set of frame image 222 perform displaying alternatively, thereby enriching the resulting dynamic edges. The edge corresponding to the first set of edge pixels 221 and the edge corresponding to the second set of edge pixels 222 are formed, respectively. Moreover, due to the alternate display and the view retention of the human eye, a visual effect of the edge being located between the edge corresponding to the first set of edge pixels 221 and the edge corresponding to the second set of edge pixels 222 may be achieved. Thus, the zigzag at the edge can be blurred. Moreover, bad points in a visual sense resulting from non-display of a set of edge pixels for a prolonged time can be avoided. Moreover, the flash frequency is constant and thus the human eye does not feel tired easily.

Figure 18:
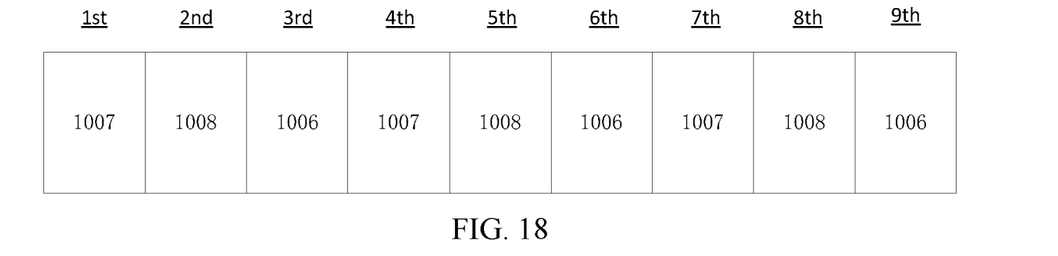
FIGS. 18 and 19 each are a schematic diagram of a partial frame arrangement according to another embodiment of the present disclosure.
Figure 19:
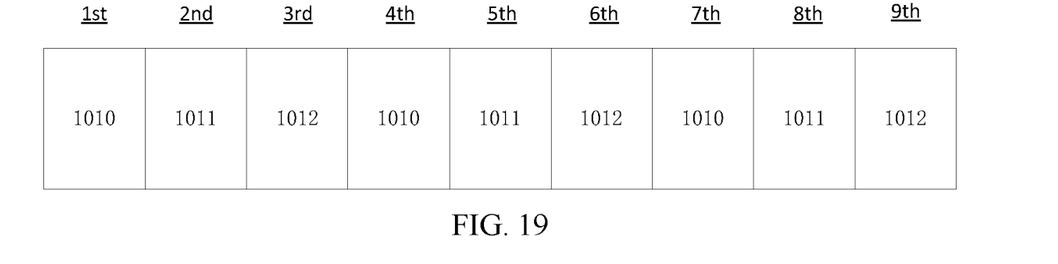

FIGS. 10 to 17 each are a schematic diagram of a partial frame image in another embodiment of the present disclosure. FIGS. 18 to 19 each are a schematic diagram of a partial frame arrangement in another embodiment of the present disclosure. In an embodiment of the present disclosure, with reference to FIG. 10, the edge pixels may be divided into three sets, i.e., a third set of edge pixels 223, a fourth set of edge pixels 224, and a fifth set of edge pixels 225. The dividing is performed based on a percentage of a part of the edge pixels 22 located inside the edge position 10. An area of a part of edge pixels in the third set of edge pixels 223 located at a side of the edge position close to a center of the display region is larger than or equal to 67% of a total area of the edge pixels. An area of a part of edge pixels in the fourth set of edge pixels 224 located at a side of the edge position close to the center of the display region is larger than or equal to 33% of a total area of the edge pixels and smaller than 67% of the total area. An area of a part of edge pixels in the fifth set of edge pixels 225 located at a side of the edge position close to a center of the display region is smaller than 33% of a total area of the edge pixels. If a region of the display panel 100 located inside the edge position 10 is referred to as a preset display region, an edge pixel 22 belongs to the third set of edge pixels 223 when an area of a part of this edge pixel 22 located in the preset display region is larger than or equal to 67% of a total area of this edge pixel 22; an edge pixel 22 belongs to the fourth set of edge pixels 224 when an area of a part of this edge pixel 22 located in the preset display region is larger than or equal to 33% of a total area of this edge pixel 22 and smaller than 67% of the total area; and an edge pixel 22 belongs to the fifth set of edge pixels 225 when an area of a part of this edge pixel 22 located in the preset display region is smaller than 33% of a total area of this edge pixel 22. With such dividing of the sets of edge pixels on basis of respective areas, at least three dynamic edges can be arranged in a direction from the display region towards the non-display region, so that an edge is located among the three edges, thereby blurring the zigzag at the edge.

FIGS. 10 to 17 each are a partial enlarged schematic diagram of a dashed box of FIG. 1, which represents a possible frame image based on the abovementioned dividing. The details on how the set of edge pixels is configured not to perform display are analogous to those in the embodiments of FIGS. 3 to 6, and will not be further described herein.

FIGS. 18 to 19 each are a schematic diagram of a partial frame arrangement in an embodiment of the present disclosure. The details on how the frames are displayed are similar to those in the embodiments of FIGS. 7 to 9, and will not be further described herein.

In an embodiment of the present disclosure, referring to FIG. 19, the frame images are divided into a $(3k+1)^{th}$ frame image, a $(3k+2)^{th}$ frame image, and a $(3k+3)^{th}$ frame image. Here, k≥0, and k is an integer. In the $(3k+1)^{th}$ frame image, the third set of edge pixels 223 is configured to display the frame image, and both the fourth set of edge pixels 224 and the fifth set of edge pixels 225 are configured not to display the frame image. In the $(3k+2)^{th}$ frame image, the fourth set of edge pixels 224 is configured to display the frame image, and both the third set of edge pixels 223 and the fifth set of edge pixels 225 are configured not to display the frame image. In the $(3k+3)^{th}$ frame image, the fifth set of edge pixels 225 is configured to display the frame image, and both the third set of edge pixels 223 and the fourth set of edge pixels 224 are configured not to display the frame image. With reference to FIG. 19, the frame image 1010 is displayed in the $1^{st}$ frame, $4^{th}$ frame, $7^{th}$ frame, $10^{th}$ frame, and so on. The frame image 1011 is displayed in the $2^{nd}$ frame, $5^{th}$ frame, $8^{th}$ frame, $11^{th}$ frame, and so on. The frame image 1012 is displayed in the $3^{rd}$ frame, $6^{th}$ frame, $9^{th}$ frame, $12^{th}$ frame, and so on. In this way, the dividing of the sets of edge pixels can be done more finely, and there may be more edge positions available in the dynamic frame display, thereby further blurring the edge position. Moreover, each set of edge pixels may flash evenly, and thus the human eye does not easily feel tired.

In an embodiment of the present disclosure, the frame images are divided into a $(3k+1)^{th}$ frame image, a $(3k+2)^{th}$ frame image, and a $(3k+3)^{th}$ frame image. Here, k≥0, and k is an integer. In each frame image of the $(3k+1)^{th}$ frame image, the $(3k+2)^{th}$ frame image and the $(3k+3)^{th}$ frame image, two sets of the third set of edge pixels 223, the fourth set of edge pixels 224 and the fifth set of edge pixels 225 are configured to display a frame image. Different sets of edge pixels are configured not to display the frame image in successive frame images. In an example, with reference to FIG. 18, the frame image 1007 is displayed in the $1^{st}$ frame, $4^{th}$ frame, $7^{th}$ frame, $10^{th}$ frame, and so on, the fourth set of edge pixels 224 is configured not to perform displaying, and both the third set of edge pixels 223 and the fifth set of edge pixels 225 are configured to perform displaying; the frame image 1008 is displayed in the $2^{nd}$ frame, $5^{th}$ frame, $8^{th}$ frame, $11^{th}$ frame, and so on, the fifth set of edge pixels 225 is configured not to perform displaying, and both the fourth set of edge pixels 224 and the third set of edge pixels 223 are configured to perform displaying; the frame image 1006 is displayed in the $3^{rd}$ frame, $6^{th}$ frame, $9^{th}$ frame, $12^{th}$ frame, and so on, the third set of edge pixels 223 is configured not to perform displaying, and both the fourth set of edge pixels 224 and the fifth set of edge pixels 225 are configured to perform displaying. In this way, the edge pixels can be divided more finely and can flash more evenly, and there may be more edge positions available in the dynamic frame display, thereby further blurring the edge position. In addition, this can avoid a same set of edge pixels being configured not to perform displaying in two successive frames, which would otherwise make the human eye detect poor display.

It should be noted that, in addition to the abovementioned dividing of the set of edge pixels on basis of respective areas, an embodiment of the present disclosure further proposes to sequentially arrange all the edge pixels group in a direction along which the edge position extends, and two successive edge pixels of all the edge pixels belong to different sets of edge pixels. In this way, the edge pixels can also be evenly divided into sets of edge pixels. If a plurality of adjacent edge pixels belong to a same set of edge pixels, these adjacent edge pixels will form a color block. When these color blocks appear in a same frame image, it appears to a black dot flashing, which affects impressions of the display panel. In this embodiment, adjacent edge pixels arranged along the direction along which the edge position extends belong to different sets of edge pixels. Therefore, the black dot flashing can be avoided, thereby improving the display effect.

With reference to FIG. 1, the present disclosure further provides a display panel having a device for processing an edge. The display panel includes an edge determination module 31, a dividing module 32, and an image processing module 33. The edge determination module 31 is configured to determine an edge position and determine all edge pixels the edge position 10 passes through. The edge position 10 is a special-shaped edge. The dividing module 32 is configured to divide all the edge pixels into n sets of edge pixels, where n≥2. The image processing module 33 is configured to input frame image information to the display panel. The frame image includes display information of the set of edge pixels. At least one set of edge pixels is configured not to display a frame image in at least one display frame. The operating process of the device for processing the edge in this embodiment is the same as the edge processing method in the above embodiments, and, for brevity and conciseness, will not be further described herein.

Further, the image processing module 33 includes a frame image generation module 331 and a frame image transmission module 332. The frame image generation module 331 is configured to divide the frame image information into sets of frame image information, and a different set of frame image information includes display information of a different set of edge pixels. The frame image transmission module is configured to transmit the frame image information to the display panel. The operating process of the device for processing the edge in this embodiment is the same as the edge processing method in the above embodiments, and will not be further described herein.

With the edge processing method for the display panel and the display panel including the device for processing the edge according to the present disclosure, all edge pixels are divided into n sets of edge pixels, where n≥2. The frame image information is inputted to the display panel. At least one set of edge pixels is configured to display a frame image in at least one display frame, and not to display a frame image in at least another display frame. The pixels at the special-shaped edge of the special-shaped panel are configured to display a frame image in some display frames and not to display a frame image in some other display frames, so that the edge position of the frame image can be dynamically adjusted to be at a preset edge position. In this way, the edge can be blurred and the zigzag at the edge can be eliminated. Moreover, the brightness of the edge pixels can also be reduced, so as to alleviate the zigzag at the edge. Moreover, there is no need to change the panel design, thereby resulting in the low cost and the high efficiency.

It should be understood by those skilled in the art that, for making the description convenient and concise, the working process of the system, the device and the unit described above can refer to the corresponding process in the method embodiments described above, and details are not further described herein.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

What is claimed is:

1. An edge processing method for a display panel, comprising:
   determining an irregular edge of the display panel and determining all edge pixels the irregular edge passes through;
   dividing all the edge pixels into n sets of edge pixels, where n≥2; and
   inputting frame image information to the display panel, wherein at least one set of the n sets of edge pixels is configured to display a frame image in at least one display frame, and is configured not to display the frame image in at least another display frame, in such a manner that the frame image in the at least one display frame and the frame image in the at least another display frame have different edge positions.

2. The edge processing method according to claim 1, wherein different sets of edge pixels are configured not to display the frame image in at least two display frames.

3. The edge processing method according to claim 2, wherein the at least two display frames are successive display frames.

4. The edge processing method according to claim 2, wherein n is 2, and the n sets of edge pixels comprise a first set of edge pixels and a second set of edge pixels;

the frame image is an odd-numbered frame image or an even-numbered frame image;
in the odd-numbered frame image, the first set of edge pixels is configured to display the frame image; and
in the even-numbered frame image, the first set of edge pixels is configured not to display the frame image.

5. The edge processing method according to claim 4, wherein in the odd-numbered frame image, the first set of edge pixels is configured to display the frame image, and the second set of edge pixels is configured not to display the frame image; and
in the even-numbered frame image, the first set of edge pixels is configured not to display the frame image, and the second set of edge pixels is configured to display the frame image.

6. The edge processing method according to claim 5, wherein
an area of a part of edge pixels in the first set of edge pixels located at a side of the irregular edge close to a center of a display region is larger than or equal to 50% of a total area of the edge pixels in the first set of edge pixels; and
an area of a part of edge pixels in the second set of edge pixels located at the side of the irregular edge close to the center of the display region is smaller than 50% of a total area of the edge pixels in the second set of edge pixels.

7. The edge processing method according to claim 1, wherein the frame image information comprises m sets of frame image information, and different sets of frame image information correspond to different sets of edge pixels configured not to display the frame image, and wherein m≤n.

8. The edge processing method according to claim 7, wherein the m sets of frame image information are sequentially displayed.

9. The edge processing method according to claim 1, wherein in one display frame, the at least one set of edge pixels configured not to display the frame image is configured not to perform display.

10. The edge processing method according to claim 1, wherein in one display frame, the at least one set of edge pixels configured not to display the frame image is configured to display a black color or a gray color.

11. The edge processing method according to claim 1, wherein in one display frame, a maximum display brightness of pixels in the at least one set of edge pixels configured to display the frame image is lower than a maximum display brightness of pixels other than the edge pixels in the display panel.

12. The edge processing method according to claim 1, wherein n is 3, and the n sets of edge pixels comprise a third set of edge pixels, a fourth set of edge pixels, and a fifth set of edge pixels;
an area of a part of edge pixels in the third set of edge pixels located at a side of the irregular edge close to a center of a display region is larger than or equal to 67% of a total area of the edge pixels in the third set of edge pixels;
an area of a part of edge pixels in the fourth set of edge pixels located at the side of the irregular edge close to the center of the display region is larger than or equal to 33% of a total area of the edge pixels in the fourth set of edge pixels, and smaller than 67% of the total area of the edge pixels in the fourth set of edge pixels; and an area of a part of edge pixels in the fifth set of edge pixels located at a side of the irregular edge close to a center of the display region is smaller than 33% of a total area of the edge pixels in the fifth set of edge pixels.

13. The edge processing method according to claim 12, wherein the frame image is a (3k+1)th frame image, a (3k+2)th frame image, or a (3k+3)th frame image, where k is an integer greater than or equal to 0;
in the (3k+1)th frame image, the third set of edge pixels is configured to display the frame image, and both the fourth set of edge pixels and the fifth set of edge pixels are configured not to display the frame image;
in the (3k+2)th frame image, the fourth set of edge pixels is configured to display the frame image, and both the third set of edge pixels and the fifth set of edge pixels are configured not to display the frame image; and
in the (3k+3)th frame image, the fifth set of edge pixels is configured to display the frame image, and both the third set of edge pixels and the fourth set of edge pixels are configured not to display the frame image.

14. The edge processing method according to claim 12, wherein the frame image is a (3k+1)th frame image, a (3k+2)th frame image, or a (3k+3)th frame image, where k is an integer greater than or equal to 0; and
in each frame image of the (3k+1)th frame image, the (3k+2)th frame image and the (3k+3)th frame image, any two sets of the third set of edge pixels, the fourth set of edge pixels and the fifth set of edge pixels are configured to display the frame image; and in two successive frame images of the (3k+1)th frame image, the (3k+2)th frame image and the (3k+3)th frame image, different sets of edge pixels are configured not to display the frame image.

15. The edge processing method according to claim 1, wherein the irregular edge is at least one smooth curve, or the irregular edge is at least one oblique line.

16. The edge processing method according to claim 1, wherein all the edge pixels are sequentially arranged in a direction along which the irregular edge extends, and two adjacent edge pixels of all the edge pixels belong to different sets of edge pixels.

17. A display panel, comprising:
a device for processing an edge,
wherein the device for processing the edge comprises:
an edge determination module circuit configured to determine an irregular edge and determine all edge pixels the irregular edge passes through;
a dividing module circuit configured to divide all the edge pixels into n sets of edge pixels, where n≥2; and
an image processing module circuit configured to input frame image information to the display panel, wherein the frame image information comprises display information of the n sets of edge pixels, and wherein at least one set of the n sets of edge pixels is configured to display a frame image in at least one display frame, and is configured not to display a frame image in at least one another display frame, in such a manner that the frame image in the at least one display frame and the frame image in the at least another display frame have different edge positions.

18. The display panel according to claim 17, wherein image processing module circuit comprises a frame image generation module circuit and a frame image transmission module circuit,
the frame image generation module circuit is configured to divide the frame image information into sets of frame image information, and a different set of frame image information comprises display information of a different set of edge pixels; and the frame image transmission module circuit is configured to transmit the frame image information to the display panel.

\* \* \* \* \*